(12) United States Patent
Markley et al.

(10) Patent No.: US 7,632,200 B2
(45) Date of Patent: Dec. 15, 2009

(54) COMMON LINK DUAL ARM TENSIONING DEVICE

(75) Inventors: George L. Markley, Montour Falls, NY (US); Sam A. Kuznets, Burdett, NY (US)

(73) Assignee: BorgWarner Inc., Auburn Hills, MI (US)

( * ) Notice: Subject to any disclaimer, the term of this patent is extended or adjusted under 35 U.S.C. 154(b) by 703 days.

(21) Appl. No.: 11/145,789

(22) Filed: Jun. 6, 2005

(65) Prior Publication Data

US 2006/0276285 A1 Dec. 7, 2006

(51) Int. Cl.
*F16H 7/08* (2006.01)
*F16H 7/22* (2006.01)

(52) U.S. Cl. .................. 474/111; 474/109; 474/110; 474/140

(58) Field of Classification Search ............. 474/111, 474/140; 180/428
See application file for complete search history.

(56) References Cited

U.S. PATENT DOCUMENTS

| | | | | |
|---|---|---|---|---|
| 3,856,101 A * | 12/1974 | Allison | ............... | 180/428 |
| 4,069,719 A | 1/1978 | Cancilla | ............... | 74/242.11 |
| 4,553,509 A | 11/1985 | Mezger et al. | ........... | 123/90.27 |
| 6,062,999 A * | 5/2000 | Suzuki et al. | ............... | 474/111 |
| 6,167,686 B1 | 1/2001 | Becker et al. | ............... | 56/17.3 |
| 6,322,469 B1 | 11/2001 | Markley | .................. | 474/111 |
| 6,322,470 B1 | 11/2001 | Markley et al. | ............. | 474/111 |
| 6,358,169 B1 | 3/2002 | Markley | .................. | 474/111 |
| 6,830,524 B2 * | 12/2004 | Tamai | .................... | 474/134 |
| 6,849,015 B2 | 2/2005 | Markley et al. | ............. | 474/111 |
| 2002/0042315 A1* | 4/2002 | Poiret | .................... | 474/111 |
| 2003/0153420 A1 | 8/2003 | Rogers | .................. | 474/134 |
| 2004/0116239 A1 | 6/2004 | Wafzig | .................. | 476/40 |
| 2006/0270502 A1* | 11/2006 | Markley et al. | ............. | 474/111 |

FOREIGN PATENT DOCUMENTS

JP 62-24062 2/1987

* cited by examiner

*Primary Examiner*—Robert A Siconolfi
*Assistant Examiner*—Robert T Reese
(74) *Attorney, Agent, or Firm*—Brown & Michaels, PC (57) ABSTRACT

A chain tensioning device links multiple tensioning arms to a common link, causing the tensioning arms to rotate into and displace chain strands with a single applied force and motion. The two tensioning arms rotate and tension proportionally, and when the pivot pin distances are equal, the two tensioning arms rotate and tension equally. The chain tensioner is preferably used to tension two slack chains flanking an auxiliary drive shaft. The chain tensioner is biased against the chain by a hydraulic tensioning assembly in one embodiment and by a spring tensioning assembly in another embodiment.

12 Claims, 6 Drawing Sheets

COMMON LINK DUAL ARM TENSIONING DEVICE

BACKGROUND OF THE INVENTION

1. Field of the Invention

The invention pertains to the field of chain tensioners. More particularly, the invention pertains to a dual arm tensioner for tensioning strands flanking an auxiliary drive sprocket.

2. Description of Related Art

As a chain wears, the distance between the links increases, leading to an overall increase in the length of the chain over time. In many situations it is desirable to tension more than one strand of a multi-strand chain simultaneously. In an engine timing system having overhead cams, an auxiliary drive on the slack strand is often positioned such that one tensioning arm is incapable of absorbing the chain length increase due to wear, both above and below the auxiliary drive.

Using two separate tensioning systems is an obvious first consideration, but it is often desirable to tension two strands either proportionally or equally, and the probability of separate systems tensioning equally is unreliable, leaving the preferred approach to simultaneous reaction being connecting the two arms with pins and links.

Dual arm tensioners are known in the art.

In U.S. Pat. No. 6,322,469, "DUAL ARM CHAIN TENSIONER FOR CONTACTING MULTIPLE CHAIN STRANDS", issued Nov. 27, 2001, the dual arms act on a tight and a slack strand and are moved laterally in the same direction by a common force.

In U.S. Pat. No. 6,322,470, "PIVOTING DUAL ARM CHAIN TENSIONER SYSTEM FOR CONTACTING MULTIPLE CHAIN STRANDS", issued Nov. 27, 2001, the dual arms act on a tight and a slack strand and are moved toward each other during tensioning by a common pivoting lever.

In U.S. Pat. No. 6,358,169, "CHAIN TENSIONING SYSTEM HAVING A PIVOTING TENSIONER ARM", issued Mar. 19, 2002, the dual arms act on a tight and a slack strand by rotation simultaneously about a common pivot point.

In Japanese Publication No. 62-024062, "CHAIN TENSIONER OF A V-ENGINE", published Feb. 2, 1987, a push rod pushes a protrusion to rotate an arm body. Rotating the arm body pushes two arms attached to the arm body against the distal ends of two separate tensioner bands, thereby biasing the two tensioner bands against two chains of a v-type engine.

There is a need in the art for a dual arm chain tensioner for tensioning two slack strands simultaneously using a proportional tensioning force on the two strands.

SUMMARY OF THE INVENTION

The chain tensioning device links multiple tensioning arms to a common link, causing the tensioning arms to rotate into and displace chain strands with a single applied force and motion. The two tensioning arms rotate and tension proportionally, and when the pivot radii are equal, the two tensioning arms rotate and tension equally. The chain tensioner is preferably used to tension two slack chains flanking an auxiliary drive shaft. The chain tensioner is biased against the chain by a hydraulic tensioning assembly in one embodiment and by a spring tensioning assembly in another embodiment.

The tensioning device imparts tension to a chain or belt having a first slack strand and a second slack strand. The tensioning device includes a link bar having a link body with a first link end and a second link end opposite the first link end and a biasing surface attached to the link body. The tensioning device further includes a driving device fixedly mounted and including a housing and a driving piston extending from the housing. The driving piston is biased away from the housing and contacts the biasing surface of the link bar.

The tensioning device further includes a first tensioner and a second tensioner. Each tensioner has a tensioner body rotatably connected to a link end of the link bar by a body pivot pin. Each tensioner also has a tensioner arm extending from the tensioner body with a proximal end with a curved engaged surface formed on a lower surface thereof and a distal end opposite the proximal end. A first arcuately curved strand sliding surface of the arm contacts a strand and extends between the proximal end and the distal end. Each tensioner is rotatably mounted by an arm pivot pin at the proximal end.

The driving piston pushes on the biasing surface and moves the link bar, simultaneously rotating each tensioner about its respective arm pivot pin to increase tension imparted to its respective strand by its respective strand sliding surface to increase tension imparted to the second strand by the second strand sliding surface.

A method of proportionally tensioning a first slack strand and a second slack strand of a chain or belt includes rotatably mounting a first tensioner arm to contact and tension the first slack strand. The method also includes rotatably mounting a second tensioner arm to contact and tension the second slack strand. The method further includes rotatably connecting a link bar to the first tensioner arm at a first distance from where the first tensioner arm is rotatably mounted. The method also includes rotatably connecting the link bar to the second tensioner arm at a second distance from where the second tensioner arm is rotatably mounted. The method further includes driving the link bar to rotate simultaneously the first tensioner arm and the second tensioner arm proportionally to tension the first slack strand proportionally to the second slack strand such that a proportion of a degree of rotation of the first arm to the second arm is inversely related to a proportion of the first distance to the second distance.

DETAILED DESCRIPTION OF THE INVENTION

The present invention simultaneously tensions two strands of a multi-strand chain system. The invention is preferably used to tension a pair of slack strands flanking a sprocket. The usefulness of the present invention is illustrated in an engine timing system having overhead cams and an auxiliary drive on the slack strand positioned such that one tensioning arm is incapable of absorbing the chain length increase due to wear both above and below the auxiliary drive. The present invention is also applicable to tensioning belts.

When the two arms are linked, their relationship is fixed. Should the chain at one arm wish to act independently, it is resisted by the force available for the control of both arms. Thus, the chain tensioner provides greater chain control and better damping possibilities than single tensioning devices each having half the available force of both arms.

A chain tensioner of the present invention is adaptable to various lengths and various positions of strands to be tensioned. The chain strands do not need to be equal in length. The force provided by the tensioner is divided between the two tensioning arms.

The two tensioning arms are placed such that rotation about their pivot pins, for the purpose of tensioning the slack side chain above and below an auxiliary drive sprocket, results in the same clocking direction. In this particular case, the auxiliary drive sprocket is preferably placed outside the normal profile of the chain path, providing for space within the chain perimeter in excess of that required for normal control through a chain's life.

Figure 1:
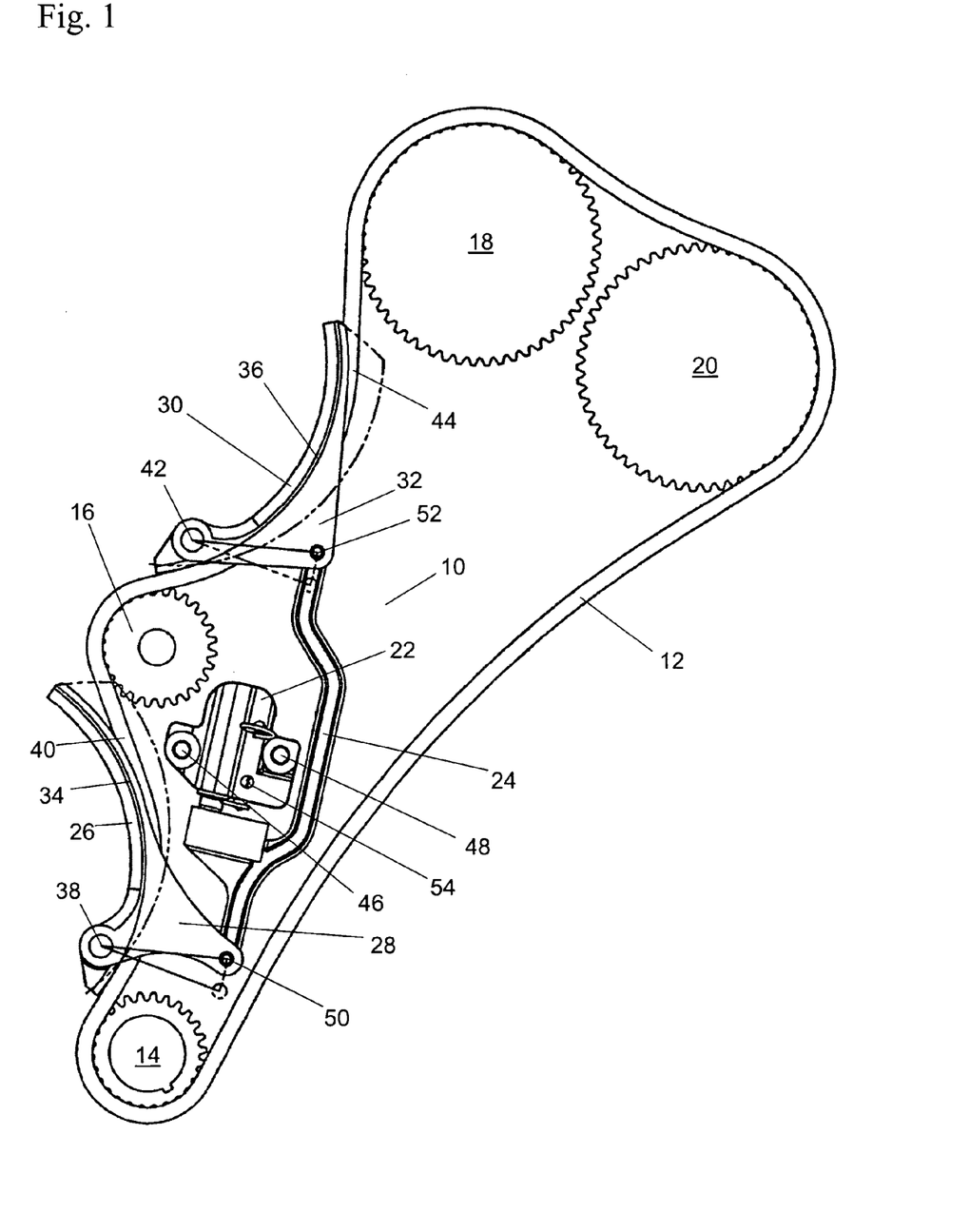
FIG. 1 shows an embodiment of the present invention tensioning a chain.

Referring to FIG. 1, a chain tensioner 10 of the present invention is shown tensioning a chain 12. The chain 12 is driven by a driving sprocket 14 to an auxiliary drive sprocket 16, a first driven sprocket 18, and a second driven sprocket 20. The tensioner 10 includes a tensioning assembly 22, a link bar 24, a first tensioning arm 26, which is an extension of a first tensioning body 28, and a second tensioning arm 30, which is an extension of a second tensioning body 32. The tensioning arms 26, 30 have respective chain contacting faces 34, 36. The first tensioning arm 26 pivots around a first arm pivot pin 38 to tension a chain strand 40 on one side of the auxiliary drive sprocket 16, while the second tensioning arm 30 pivots around a second arm pivot pin 42 to tension a chain strand 44 on the other side of the auxiliary drive sprocket 16.

The tensioning assembly 22 preferably has mounting holes 46, 48 for mounting to an engine housing. The tensioning assembly also preferably includes a ratcheting mechanism 54 for providing a limited amount of backlash from the chain and for maintaining tension upon a loss of hydraulic pressure. The ratchet teeth permit only stepwise, uni-directional movement of the link bar 24 as the chain wears over time. The pivot pins 38, 42 are also preferably attached to the engine housing (not shown). The tensioning bodies 28, 32 are rotatably connected to the ends of the link bar 24 by body pivot pins 50, 52, respectively. The tensioning arms 26, 30 are attached to their respective tensioning bodies 28, 32 and rotate with them around their respective arm pivot pins 38, 42.

Figure 2:
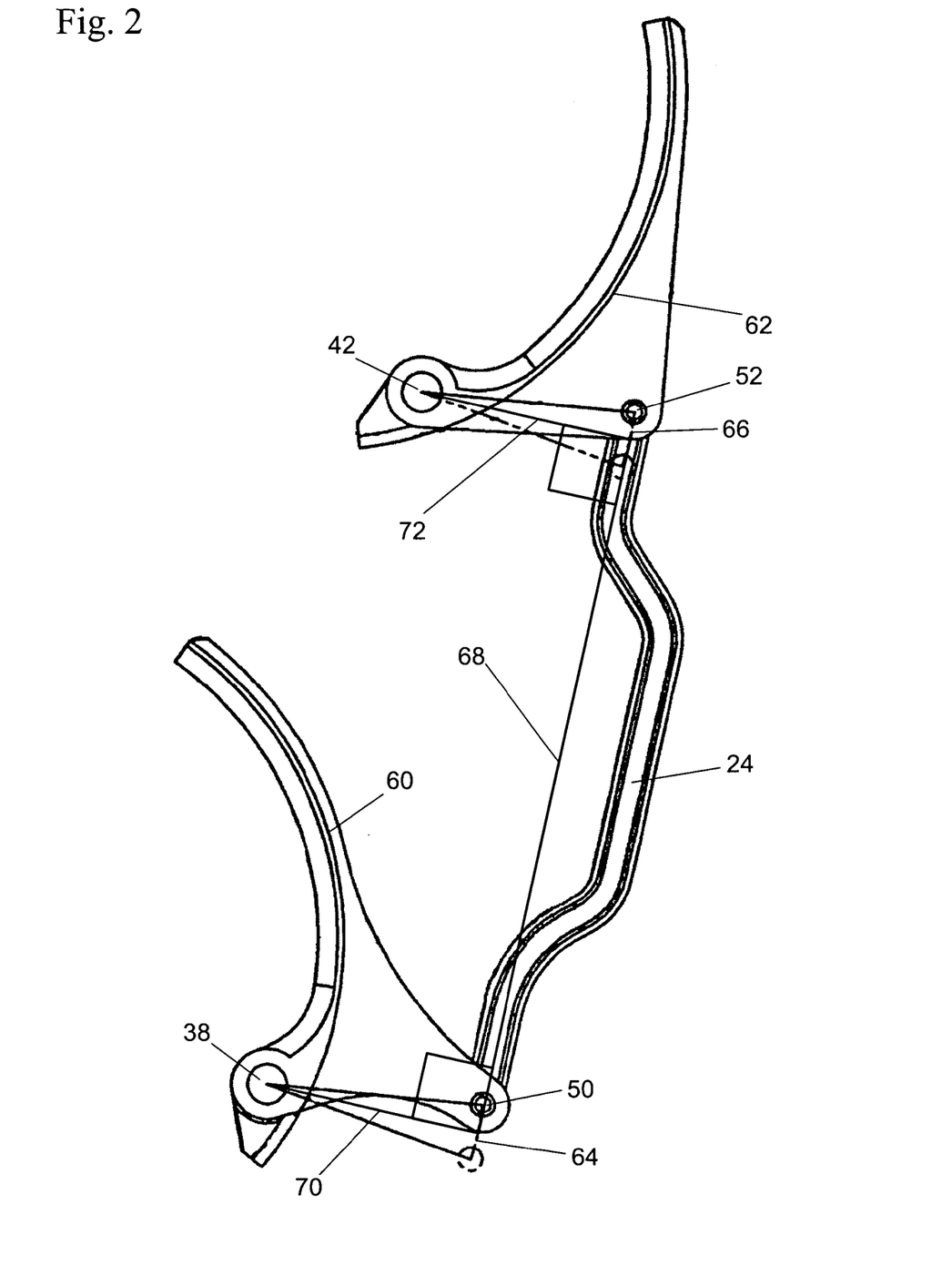
FIG. 2 shows the tensioning arms and link bar of the tensioner of FIG. 1.

Referring to FIG. 2, in designing a tensioner of the present invention for a specific application, the tensioner arm-chain interface 60, 62 shapes and the arm pivot pin 38, 42 locations are first determined. The tensioning assembly has been removed in FIG. 2 for clarity. Then, arcs 64, 66 centered at the arm pivot pins 38, 42 and passing through the body pivot pins 50, 52 are joined by a line 68 tangent to each arc and to a common side of the arc centers. Radial lines 70, 72 from the arc centers to the points of tangency represent mid-travel of the stroke of the link bar 24 when parallel to each other and perpendicular to the tangent line. If the radial lines 70, 72 are of equal length, the arms will swing equal angles.

The tangent line 68 represents the line of motion of the link bar 24, and with its length fixed, both tangent end points will move the same stroke. With the locations of the arm pivot pins 38, 42 fixed, the arcs 64, 66 represent the path lengths of the ends of the link bar 24 from a new chain condition to a worn chain condition. If the radial lines 70, 72 are of equal length, the various tangent line 68 positions are parallel to each other, and the radial lines 70, 72 are parallel to each other at each tangent line position, such that the motion from one end of the stroke to the other, at a given point is perpendicular to the mean tangent line at all points of the stroke.

The arms are preferably solid with a facility for pivoting a contact face into a chain as the result of a moment arm applied at a pinned connection to the common link bar. The link bar may be one of many configurations, but it moves as a tangent line to the arm arcs and preferably has a pad for receiving a perpendicular tensioning force. This force may be the result of a loaded spring, a hydraulic piston tensioning assembly with a non-return rack, or another biasing device.

The tensioning assembly is located with its piston centerline parallel to the mean tangent line in available space preferably at a hydraulic source. The link bar defined in the available space contains a pad for receiving a tensioning force. The link bar also has sufficient clearances to all objects, including the chain at new and worn positions, when stroked. The link bar preferably provides access for removing the tensioning assembly's locking pin and resetting the same.

Figure 3:
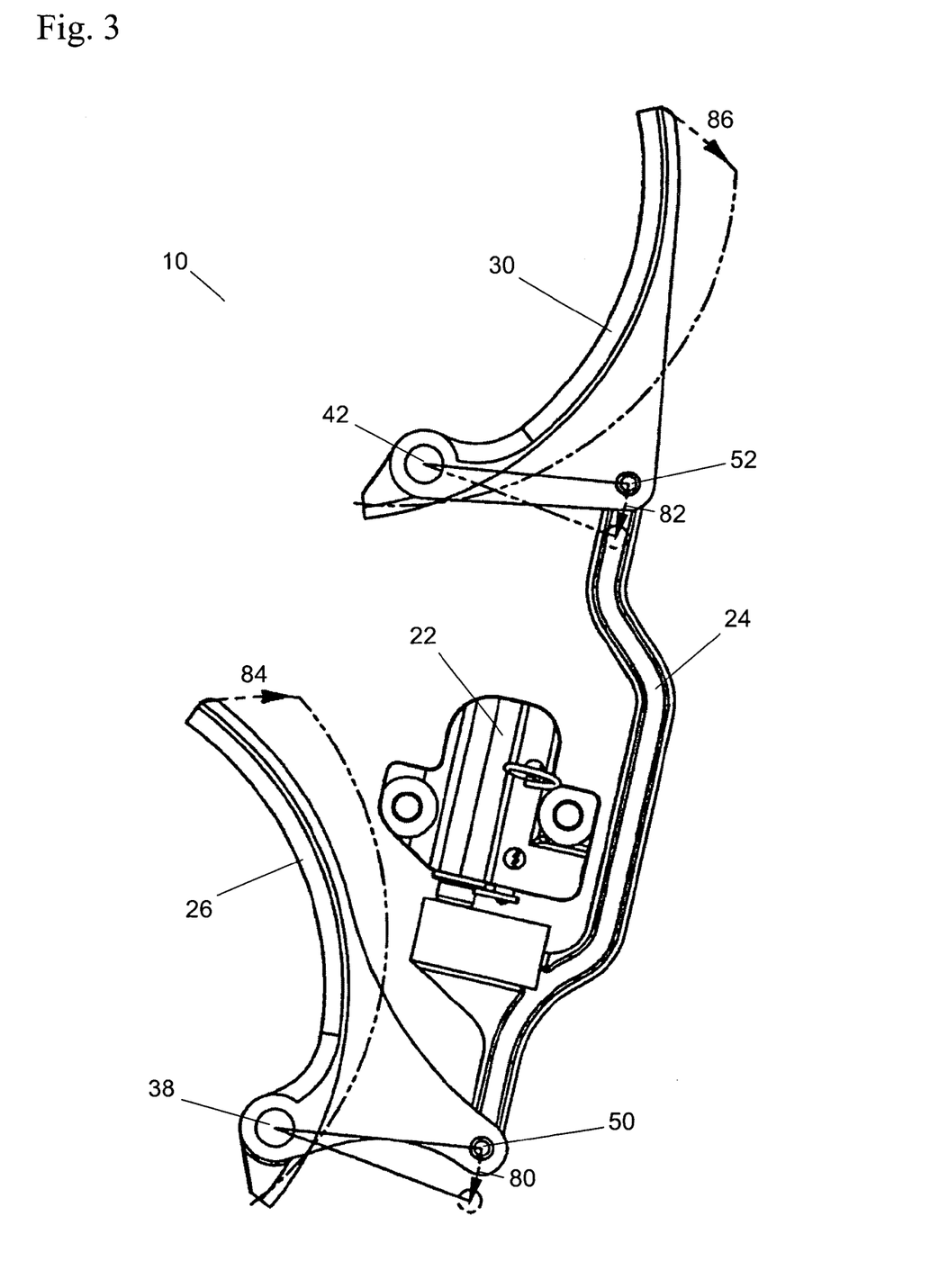
FIG. 3 shows the tensioner of FIG. 1 in a new chain position.

Referring to FIG. 3, at the new chain position, the tensioning assembly 22 of the chain tensioner 10 is retracted such that the link bar 24 and tensioning arms 26, 30 are in a first position. As the chain wears and stretches, the tensioning assembly 22 pushes the link bar 24, which causes the body pivot pins 50, 52 to rotate 80, 82 around their respective arm pivot pins 38, 42 and both arms to pivot in the same direction 84, 86, thereby tensioning the chain.

Figure 4:
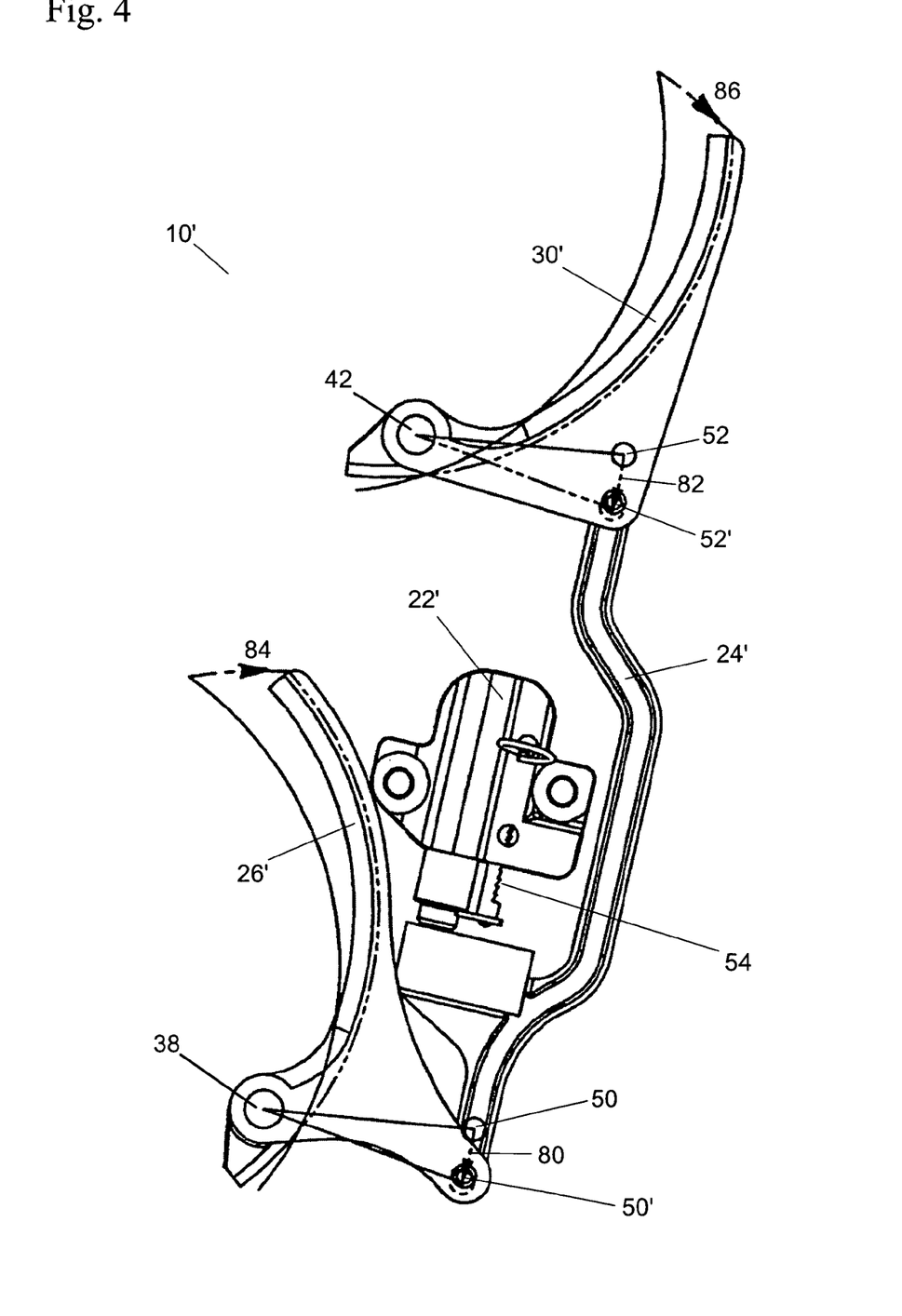
FIG. 4 shows the tensioner of FIG. 1 in a worn chain position.

Referring to FIG. 4, at a worn chain condition, the tensioning assembly 22' of the chain tensioner 10' is extended such that the link bar 24' is at a second position. The movement of the link bar 24' has caused the body pivot pins 50', 52' to rotate 80, 82 around their respective arm pivot pins 38, 42 and the two tensioning arms 26', 30' to rotate about their respective pivot pins 38, 42, in a clockwise direction 84, 86 to maintain tension in both strands of the worn chain. The ratcheting mechanism 54 of the tensioning assembly 22' is more clearly shown in FIG. 4.

Figures 5A, 5B:
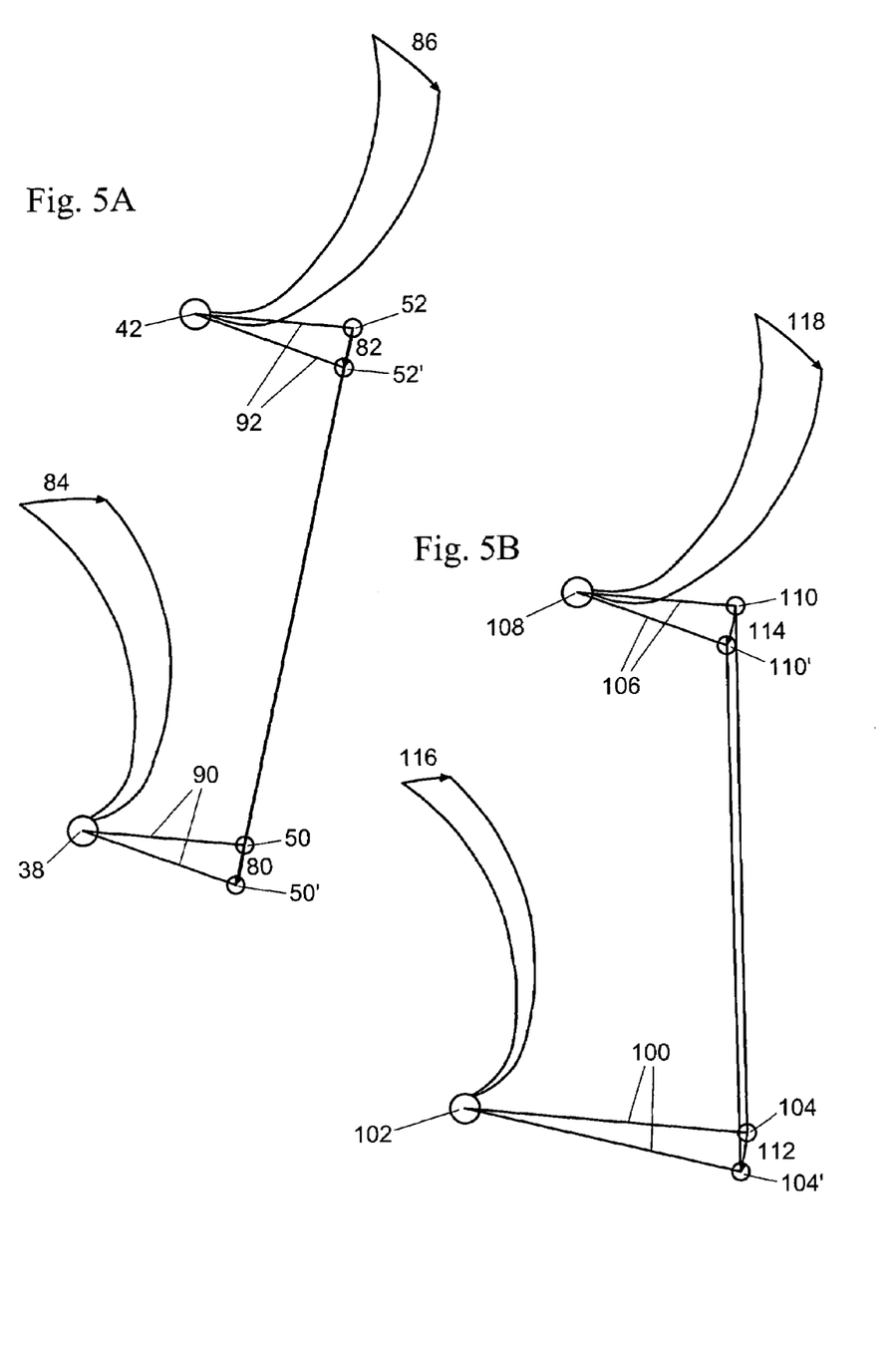
FIG. 5A shows the relative motions of the tensioner of FIG. 1 from the new chain to the worn chain position.
FIG. 5B shows the relative motions of a chain tensioner of the present invention with different pin length distances.

Referring to FIG. 5A, in the previous examples, the distance 90 between the first arm pivot pin 38 and the first body pivot pin 50 is the same as the distance 92 between the second arm pivot pin 42 and the second body pivot pin 52. Thus, when the tensioning assembly 22 acts on the link bar 24 to change the positions of the body pivot pins 50', 52' along their arcs 80, 82, the first and second tensioning arms rotate 84, 86 the same degree about their respective arm pivot pins 38, 42.

It may be advantageous in certain tensioning systems to have the two tensioning arms provide unequal but proportional tensioning to two strands of chain rather than equal tensioning. The present invention may be adapted for appropriate proportional tensioning by changing the proportion of the distances between the arm pivot pins and their respective body pivot pins.

If the arms are required to swing different angles to provide equal or proper chain take-up, the length of the parallel and perpendicular link can be adjusted, with a shorter link providing for a greater angle of arm movement. If the links are of unequal length, the various tangent line positions are angular and the motion from one end of the stroke to the other, at a given point, is angular to the mean tangent line. This circumstance requires that the stroke force be applied through an interface of a flat surface to a curved surface to maintain a linear stroke.

FIG. 5B illustrates the effect of two different pin distances on the rotation of the tensioning arms. The distance 100 between the first arm pivot pin 102 and the first body pivot pin 104 is significantly larger than the distance 106 between the second arm pivot pin 108 and the second body pivot pin 110. When the tensioning assembly acts on the link bar to change the positions of the body pivot pins 104', 110' along their arcs 112, 114, the first tensioning arm rotates 116 to a lesser degree than the second tensioning arm 118 about their respective arm pivot pins 102, 108. Thus, increasing the relative distance between arm and body pivot pins reduces the relative rotation of the respective pivot arm.

The present invention functions such that a force applied to the link bar by the tensioning assembly is transferred through the body pivot pins at each end as a moment to each tensioning arm. This moment rotates the arm into the chain until all of the slack is removed both above and below the auxiliary drive, and the chain is tensioned. The chain tensioner thereby provides control throughout the life of the chain.

If sufficient space and a hydraulic source exist outside the chain perimeter, a similar mechanism may be applied there, with the link bar reversing movement or the tensioning arms pivoting at the opposite ends.

Figure 6:
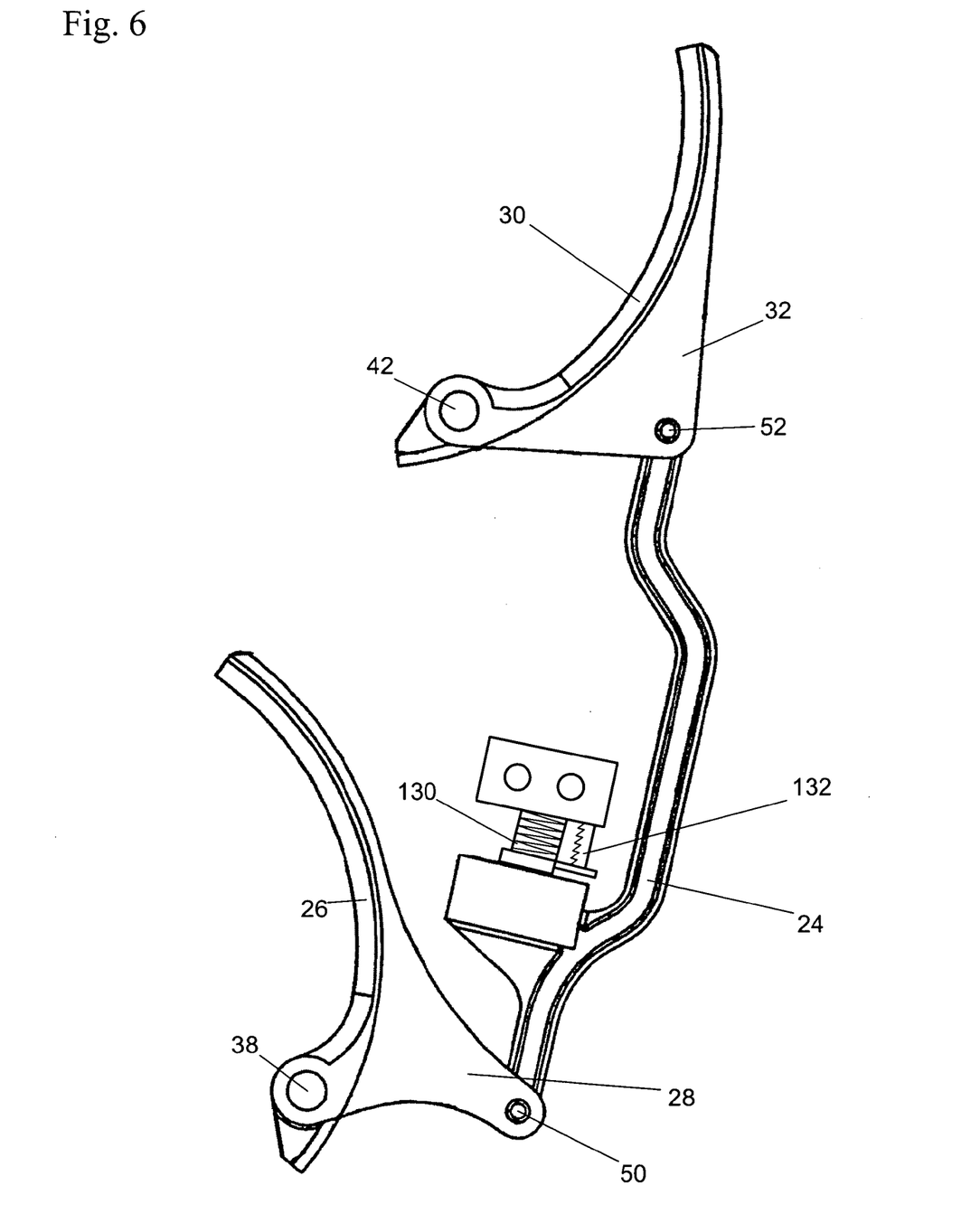
FIG. 6 shows a chain tensioner with a spring bias in an embodiment of the present invention.

Although the present invention has been described as biased by a hydraulic ratcheting tensioning assembly, other biasing means may be used within the spirit of the present invention. FIG. 6 shows a chain tensioner of the present invention biased by a compression spring 130. Various elastic means of biasing are possible using other spring types such as "extension" or "torsional" and/or some form of elastic material such as rubber. The tensioning assembly preferably includes a ratcheting component 132 to limit the amount of backlash allowed to the tensioner.

A chain tensioner of the present invention is preferably made primarily of aluminum or steel, except for preferably plastic wear faces at the chain contacting surfaces of the tensioning arms. In one embodiment, the chain tensioning arms are preferably made of high-glass filled plastic.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A tensioning device to impart tension to a chain or belt having a first slack strand and a second slack strand, the device comprising:
    a link bar having a first link end and a second link end;
    a driving device fixedly mounted and comprising a housing and a driving piston extending from the housing and biased away from the housing, wherein the driving piston drives the link bar;
    a first tensioner rotatably mounted by a first arm pivot pin and rotatably connected to the first link end of the link bar by a first body pivot pin, the first tensioner comprising:
        a first tensioner body; and
        a first tensioner arm extending from the first tensioner body and having a first proximal end with a curved engaged surface formed on a lower surface thereof, a first distal end opposite the first proximal end, and a first arcuately curved strand sliding surface for contacting the first strand and extending between the first proximal end and the first distal end, wherein the first arm pivot pin is located at the first proximal end of the first tensioner arm; and
    a second tensioner rotatably mounted by a second arm pivot pin and rotatably connected to the second link end of the link bar by a second body pivot pin, the second tensioner comprising:
        a second tensioner body; and
        a second tensioner arm extending from the second tensioner body and having a second proximal end with a curved engaged surface formed on a lower surface thereof, a second distal end opposite the second proximal end, and a second arcuately curved strand sliding surface for contacting the second strand and extending between the second proximal end and the second distal end, wherein the second arm pivot pin is located at the second proximal end of the second tensioner arm;
    wherein the link bar maintains the first body pivot pin at a fixed length apart from the second body pivot pin during a stroke of the link bar; and
    wherein the driving piston pushing on the biasing surface moves the link bar, simultaneously rotating the first tensioner about the first arm pivot pin to increase tension imparted to the first strand by the first strand sliding surface and rotating the second tensioner about the second arm pivot pin to increase tension imparted to the second strand by the second strand sliding surface.

2. The tensioning device of claim 1, wherein the first tensioner arm and the second tensioner arm are rotated in the same direction to increase tension imparted to the first strand by the first strand sliding surface and to the second strand by the second strand sliding surface.

3. The tensioning device of claim 1, wherein a spring biases the driving piston away from the housing.

4. The tensioning device of claim 1, wherein a spring and hydraulic pressure bias the driving piston away from the housing.

5. The tensioning device of claim 1, wherein the driving device further comprises a ratcheting device comprising:
    a plurality of housing ratchet teeth attached to the housing;
    a ratchet plate pawl attached to the driving piston and comprising a plurality of pawl ratchet teeth complementary to the housing ratchet teeth; and
    a ratchet biasing element for urging the ratchet plate pawl toward the housing ratchet teeth.

6. The tensioning device of claim 5, wherein the ratcheting device prevents retraction of the link bar except for some amount of backlash in addition to a length of one ratchet tooth.

7. The tensioning device of claim 1, wherein a first distance between the first body pivot pin and the first arm pivot pin equals a second distance between the second body pivot pin and the second arm pivot pin such that the first tensioner arm and the second tensioner arm rotate by an equal degree upon tensioning.

8. The tensioning device of claim 1, wherein a first distance between the first body pivot pin and the first arm pivot pin is greater than a second distance between the second body pivot pin and the second arm pivot pin such that the first tensioner arm rotates a proportionally lesser degree than the second tensioner arm upon tensioning.

9. The tensioning device of claim 8, wherein the tensioning device is mounted to have a range of motion from an initial position to a final position such that at an intermediate position between the initial position and the final position, a first line (70) from the center of the first body pivot pin to the center of the first arm pivot pin is parallel to a second line (72) from the center of the second body pivot pin to the center of the second arm pivot pin.

10. A method of proportionally tensioning a first slack strand and a second slack strand of a chain or belt, the method comprising the steps of:
    a) rotatably mounting a first tensioner arm to contact and tension the first slack strand;

b) rotatably mounting a second tensioner arm to contact and tension the second slack strand;
c) rotatably connecting a link bar to the first tensioner arm with a first body pivot pin at a first distance from where the first tensioner arm is rotatably mounted;
d) rotatably connecting the link bar to the second tensioner arm with a second body pivot pin at a second distance from where the second tensioner arm is rotatably mounted, wherein a tangent line joining the first body pivot pin and the second body pivot pin has a fixed length; and
e) driving the link bar to rotate simultaneously the first tensioner arm and the second tensioner arm proportionally to tension the first slack strand proportionally to the second slack strand such that a proportion of a degree of rotation of the first arm to the second arm is inversely related to a proportion of the first distance to the second distance.

11. The method of claim 10, wherein the step of driving the link bar further comprises the substep of applying a force to the link bar using a tensioning assembly.

12. The method of claim 11, wherein the tensioning assembly is selected from the group consisting of:
a hydraulic tensioning assembly;
a hydraulic ratchet tensioning assembly; and
a spring assembly.

* * * * *

UNITED STATES PATENT AND TRADEMARK OFFICE
CERTIFICATE OF CORRECTION

PATENT NO. : 7,632,200 B2  Page 1 of 1
APPLICATION NO. : 11/145789
DATED : December 15, 2009
INVENTOR(S) : Markley et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1085 days.

Signed and Sealed this

Second Day of November, 2010

David J. Kappos
*Director of the United States Patent and Trademark Office*